US009248968B2

(12) United States Patent
Kaneko et al.

(10) Patent No.: US 9,248,968 B2
(45) Date of Patent: Feb. 2, 2016

(54) PRODUCT STORAGE APPARATUS, PROCESSING SYSTEM, AND PRODUCT STORAGE METHOD

(71) Applicant: AMADA COMPANY, LIMITED, Kanagawa (JP)

(72) Inventors: Kentaro Kaneko, Kanagawa (JP); Yuji Araki, Kanagawa (JP)

(73) Assignee: AMADA COMPANY, LIMITED, Kanagawa (JP)

( * ) Notice: Subject to any disclaimer, the term of this patent is extended or adjusted under 35 U.S.C. 154(b) by 12 days.

(21) Appl. No.: 14/360,513

(22) PCT Filed: Oct. 5, 2012

(86) PCT No.: PCT/JP2012/075975
§ 371 (c)(1),
(2) Date: May 23, 2014

(87) PCT Pub. No.: WO2013/080667
PCT Pub. Date: Jun. 6, 2013

(65) Prior Publication Data
US 2014/0326578 A1 Nov. 6, 2014

(30) Foreign Application Priority Data
Nov. 30, 2011 (JP) ................................. 2011-261699

(51) Int. Cl.
*B65G 1/12* (2006.01)
*B65G 17/12* (2006.01)
(Continued)

(52) U.S. Cl.
CPC ............... *B65G 17/12* (2013.01); *B65G 1/133* (2013.01); *B65G 47/261* (2013.01); *B65G 47/5113* (2013.01); *B65G 2201/022* (2013.01)

(58) Field of Classification Search
CPC ....................................................... B65G 1/133
USPC ............. 198/343.1, 465.2, 475.1, 486.1, 575, 198/678.1, 685, 686, 799
See application file for complete search history.

(56) References Cited

U.S. PATENT DOCUMENTS 4,374,471 A * 2/1983 Minnetti ......................... 68/245
4,712,670 A * 12/1987 Burkhardt ................ 198/867.13
(Continued)

FOREIGN PATENT DOCUMENTS

JP S54-005318 1/1979
JP S60-64917 5/1985
(Continued)

OTHER PUBLICATIONS

International Search Report and Written Opinion of the International Searching Authority with English language translation of International Search Report in PCT/JP2012/075975, mailed Oct. 30, 2012.
(Continued)

*Primary Examiner* — Douglas Hess
(74) *Attorney, Agent, or Firm* — Greenblum & Bernstein, P.L.C.

(57) ABSTRACT

A product storage apparatus for collectively storing processed products includes an endless loop member that is circularly moved along a path, plural holders each of which is fixed to the endless loop member with a predetermined pitch and holds the processed products, and a drive unit that circularly moves the endless loop member to circularly move the plurality of holders intermittently by stopping the endless loop member temporarily at every move by a mathematical product of the pitch and a natural number n. According to the product storage apparatus, it is possible to store the processed products with high space efficiency.

11 Claims, 17 Drawing Sheets

(51) Int. Cl.
  *B65G 47/26* (2006.01)
  *B65G 1/133* (2006.01)
  *B65G 47/51* (2006.01)

(56) References Cited

U.S. PATENT DOCUMENTS

| | | | | |
|---|---|---|---|---|
| 4,757,893 | A * | 7/1988 | Shabram et al. | 198/474.1 |
| 5,176,240 | A * | 1/1993 | Harris | 198/343.1 |
| 5,371,995 | A * | 12/1994 | Guttinger et al. | 53/251 |
| 5,404,992 | A * | 4/1995 | Robu et al. | 198/465.4 |
| 5,660,264 | A * | 8/1997 | van der Schoot | 198/594 |
| 5,975,279 | A | 11/1999 | Blattner et al. | |
| 6,019,214 | A * | 2/2000 | Herronen et al. | 198/465.1 |
| 6,056,636 | A * | 5/2000 | Cody et al. | 452/51 |
| 6,293,387 | B1 * | 9/2001 | Forster | 198/377.02 |
| 6,644,462 | B2 * | 11/2003 | Hiramoto et al. | 198/478.1 |
| 7,584,837 | B2 * | 9/2009 | Roether et al. | 198/717 |
| 7,712,598 | B1 * | 5/2010 | Derby | 198/343.1 |
| 7,784,602 | B2 * | 8/2010 | Mueller | 198/470.1 |
| 2004/0108184 | A1 | 6/2004 | Weeden et al. | |

FOREIGN PATENT DOCUMENTS

| | | |
|---|---|---|
| JP | H01-317882 A | 12/1989 |
| JP | 05-069947 | 3/1993 |
| JP | 08-133486 | 5/1996 |
| JP | H08-301424 A | 11/1996 |
| JP | 2000-211720 | 8/2000 |
| JP | 2004-122169 A | 4/2004 |
| JP | 2006-068358 | 3/2006 |
| WO | 2011/109256 A1 | 9/2011 |

OTHER PUBLICATIONS

Extended European Search Report in EP12853108.4, dated Jul. 29, 2015.
Notification of Reasons for Refusal in JP 2011-261699, with English language translation, mailed Jul. 30, 2015.

* cited by examiner $ht = h1 + 0$ $ht = h1 + h3$

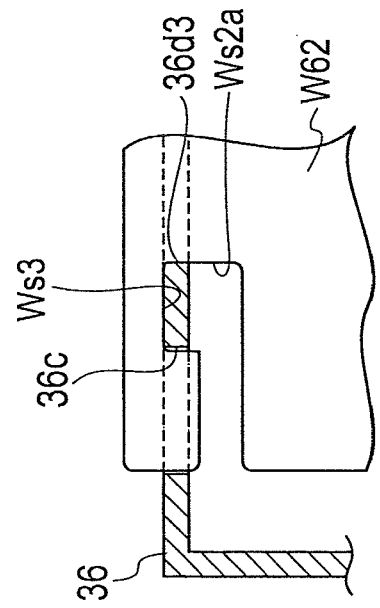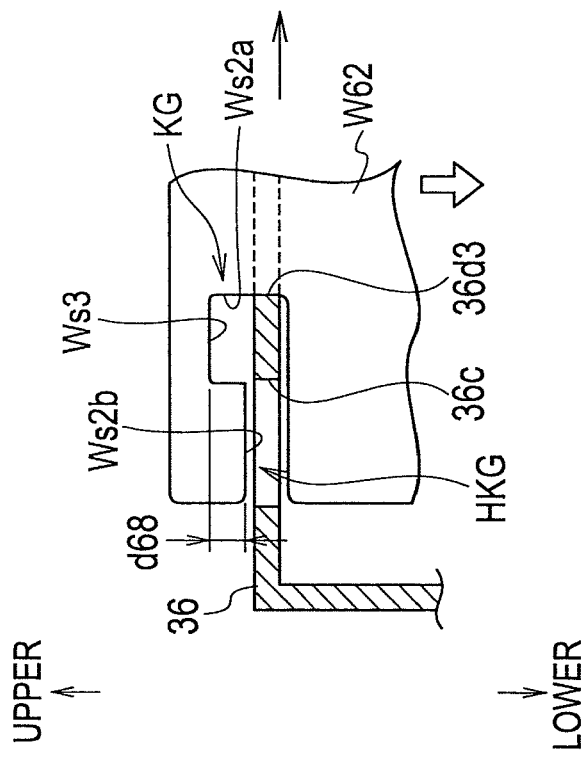

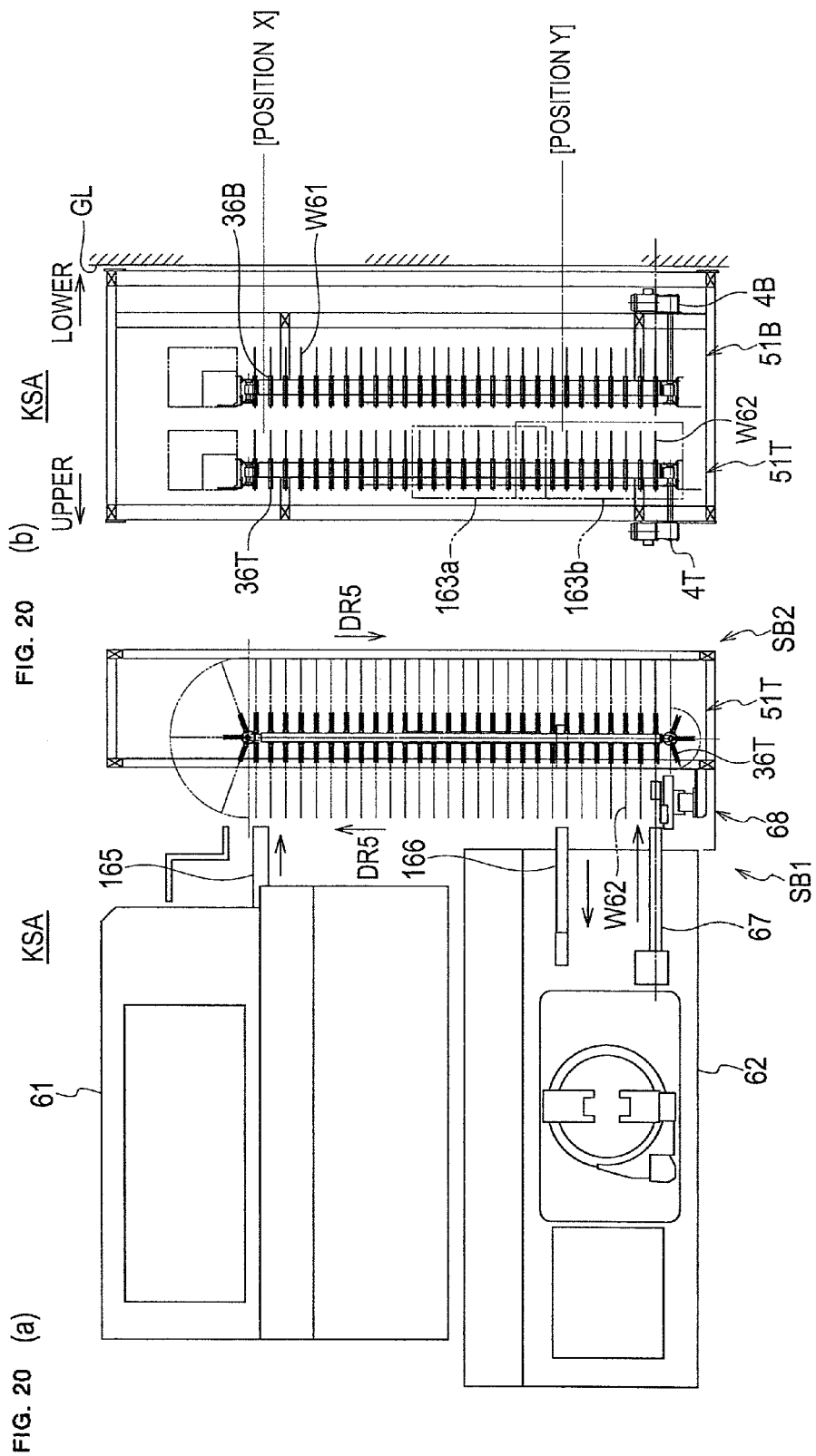

PRODUCT STORAGE APPARATUS, PROCESSING SYSTEM, AND PRODUCT STORAGE METHOD

TECHNICAL FIELD

The present invention relates to a product storage apparatus, a processing system, and a product storage method. Especially, these can be used suitably for temporal collective-storages of sterically-shaped products processed by a bending machine.

BACKGROUND ART

A Patent Document 2 listed below discloses an accumulation apparatus. In this accumulation apparatus, sterically-shaped products processed by a bending machine are stocked while being coherent with each other in a leaned state on a pallet having a backrest. Since the products are made coherent with each other, the products could be damaged. It is conceivable to storage the products without making them coherent with each other by providing partitions at predetermined intervals on the pallet and stocking the products in spaces segmented by the partitions one by one.

A patent Document 1 listed below discloses a storage apparatus for storing sterically-shaped materials, although they are not bent products, in spaces segmented by partitions one by one. When adding versatility to a storage apparatus in which partitions are provided, it is preferred that sterically-shaped products having various thicknesses, heights or widths can be stored. In the above storage apparatus, the partitions are detachable, so that each capacity of the segmented spaces can be changed by changing distances between the partitions in a stepwise manner.

PRIOR ART DOCUMENT

Patent Document

Patent Document 1: Japanese Patent Application Laid-Open No. 2006-68358
Patent Document 2: Japanese Patent Application Laid-Open No. H5-69947

SUMMARY OF INVENTION

When changing distances between the partitions, its workability is bad. Since the number of the partitions must become large when storing products having small thickness, height or width, installation works of the partitions requires many man-hours. On the other hand, when storing products having large thickness, height or width, removing works of the partitions requires many man-hours. In addition, since the partitions are required to have a size equivalent-to or larger-than a size of products to be stored, workability of the installation or removing works of the partitions becomes worse in a case where a size of products is large. Further, removed partitions are required to be stocked when to be used, so that stock spaces are needed.

Therefore, an object of the present invention is to provide a product storage apparatus, a processing system, and a product storage method that can store processed products having various dimensions with high space efficiency without degradation of workability.

A first aspect of the present invention provides a product storage apparatus for collectively storing processed products, the apparatus comprising: an endless loop member that is circularly moved along a path; a plurality of holders that is fixed to the endless loop member with a predetermined pitch and holds the processed products; and a drive unit that circularly moves the endless loop member to circularly move the plurality of holders intermittently by stopping the endless loop member temporarily at every move by a mathematical product of the pitch and a natural number n.

A second aspect of the present invention provides a processing system for processing processed products, the system comprising: a first processing machine that processes the processed products; a first storage apparatus that collectively stores the processed products processed by the first processing machine temporarily; a second processing machine that processes the processed products carried out from the first storage apparatus; and a second storage apparatus that is disposed vertically to the first storage apparatus and collectively stores the processed products processed by the second processing machine temporarily, wherein the second storage apparatus includes an endless loop member that is circularly moved along a path, a plurality of holders that is fixed to the endless loop member with a predetermined pitch and holds the processed products, and a drive unit that circularly moves the endless loop member to circularly move the plurality of holders intermittently by stopping the endless loop member temporarily at every move by a mathematical product of the pitch and a natural number n, the first storage apparatus receives the processed products processed by the first processing machine from one side and carries out the processed products to the second processing machine from the one side, and the second storage apparatus receives the processed products processed by the second processing machine from the one side and carries out the processed products from another side that is an opposite side to the one side.

A third aspect of the present invention provides a product storage method for collectively storing processed products, the method comprising: attaching a plurality of holders for holding the processed products to an endless loop member that is circularly moved along a path with a predetermined pitch; determining, according to a width of the processed product along a direction of the pitch in a state where the processed products are held by the plurality of holders, a natural number n for making the processed product held in every n pieces of the holders; and moving the endless loop member circularly and making the processed product held every n pieces of the holders base on the determined natural number n.

BRIEF DESCRIPTION OF DRAWINGS

FIG. 19(a) is a cross-sectional view showing a state just before an engagement of an engagement portion of the processed product and an engagement receive portion of the holder in the temporal storage apparatus, and FIG. 19(b) is a cross-sectional view after the engagement.

FIG. 20(a) is a plan view, and FIG. 20(b) is a front view of another embodiment of a processing system.

DESCRIPTION OF EMBODIMENTS

Figure 1:
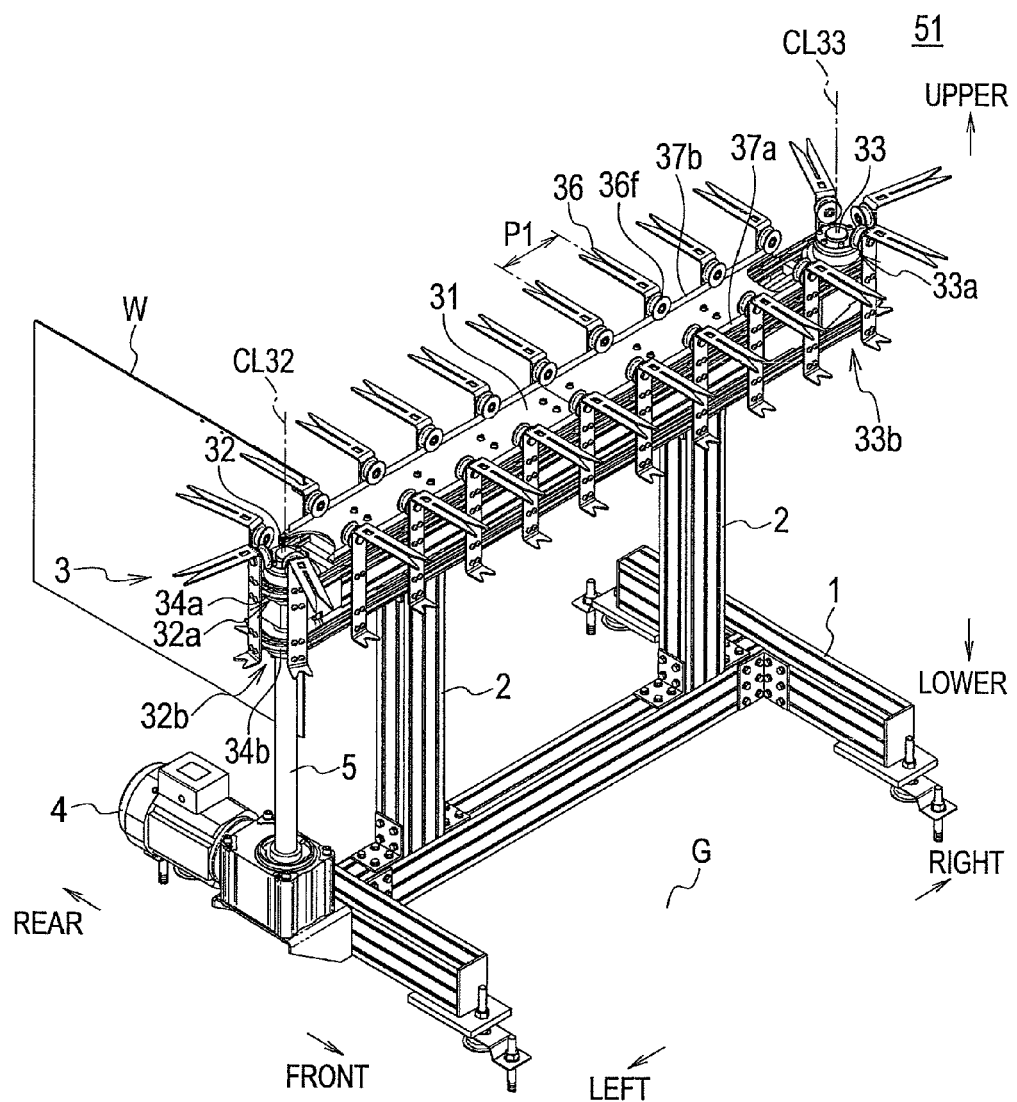
FIG. 1 It is a perspective view of an embodiment of a product storage apparatus.
Figure 2:
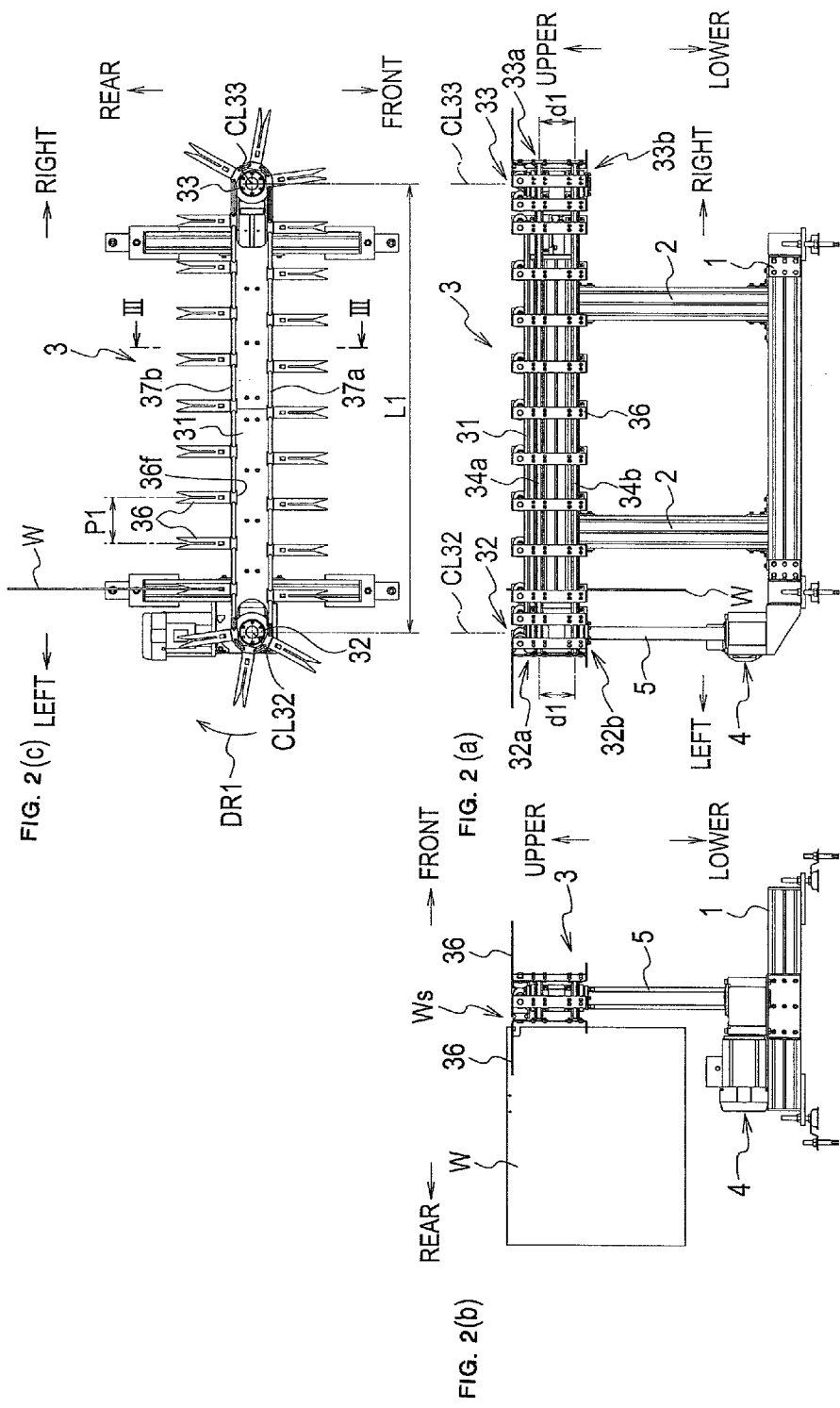
FIG. 2(a) is a front view.
FIG. 2(b) is a side view.
FIG. 2(c) is a plan view of the product storage apparatus.

An embodiment of a storage apparatus (product storage apparatus) 51 will be explained with reference to FIG. 1 to FIG. 4. As indicated by arrows in FIG. 1, upper, lower, left, right, front and rear directions are regulated for explanations. Explanations will be made hereinafter with reference to these directions.

The storage apparatus 51 is an apparatus for storing processed products (stored product) W, and is, especially, an apparatus suitable for temporal collective-storages. The storage apparatus 51 includes an H-shaped base 1 mounted on a floor surface G, a pair of support posts 2 stood upward from the base 1, a holder unit 3 that is supported by the support posts 2 and holds the products, a drive unit 4 that is attached to the base 1 and drives the holder unit 3, and a shaft 5 that transmits a drive force of the drive unit 4 to the holder unit 3.

The holder unit 3 has a frame 31 extending in a left-right direction. A roller 32 is provided at a left end of the frame 31. A rotational axis CL32 of the roller 32 extends in an upper-lower direction. The roller 32 is directly (or indirectly) coupled with the shaft 5, and rotated about the rotational axis CL32 by driving of the drive unit 4. In the present embodiment, its rotational direction is a clockwise direction (an arrow DR1) in FIG. 2(c).

A roller 33 is provided at a right end of the frame 31. A rotational axis CL33 of the roller 33 also extends in the upper-lower direction. A pair of sprockets 32a and 32b is attached to the roller 32 to be made distanced vertically from each other by a distance d1 (see FIG. 2(a)). In addition, also a pair of sprockets 33a and 33b is attached to the roller 33 to be made distanced vertically from each other by the distance d1. The upper sprockets 32a and 33a are disposed at an identical height level to each other, and a chain 34a is wound around both of the sprockets 32a and 33a. Similarly, the lower sprockets 32b and 33b are disposed at an identical height level to each other, and a chain 34b is wound around both of the sprockets 32b and 33b.

Figure 4:
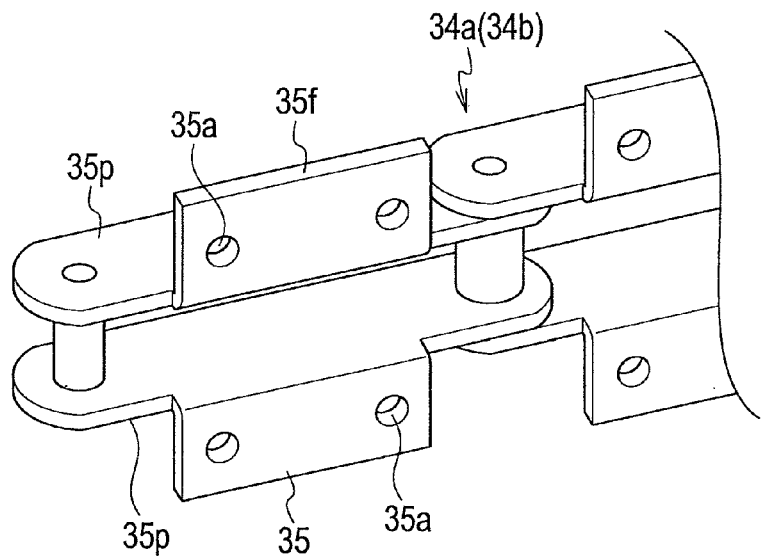
FIG. 4 It is a partial perspective view of a chain in the product storage apparatus.

As shown in FIG. 4, each of the chains 34a and 34b has upper and lower plates 35p coupled with each other, and each of the plates 35p has a flange 35f on which bolt holes 35a are formed. Holders 36 for holding the processed products W are fixed to the bolt holes 35a on the flanges 35f of the chains 34a and 34b by bolts with a constant pitch P1 (see FIG. 2(c)). Here, relationships of the number of links, the number of holders 36 and a distance L1 between the rotational axes CL32 and CL33 (see FIG. 2(c)) are set so that the chains 34a and 34b are equally segmented by the pitches P1, respectively. Note that a string-shaped or band-shaped endless loop member(s) such as an endless belt may be used in substitution for the chains 34a and 34b. The endless loop member(s) is circularly moved by the drive unit 4 along a given path (track).

Figure 3:
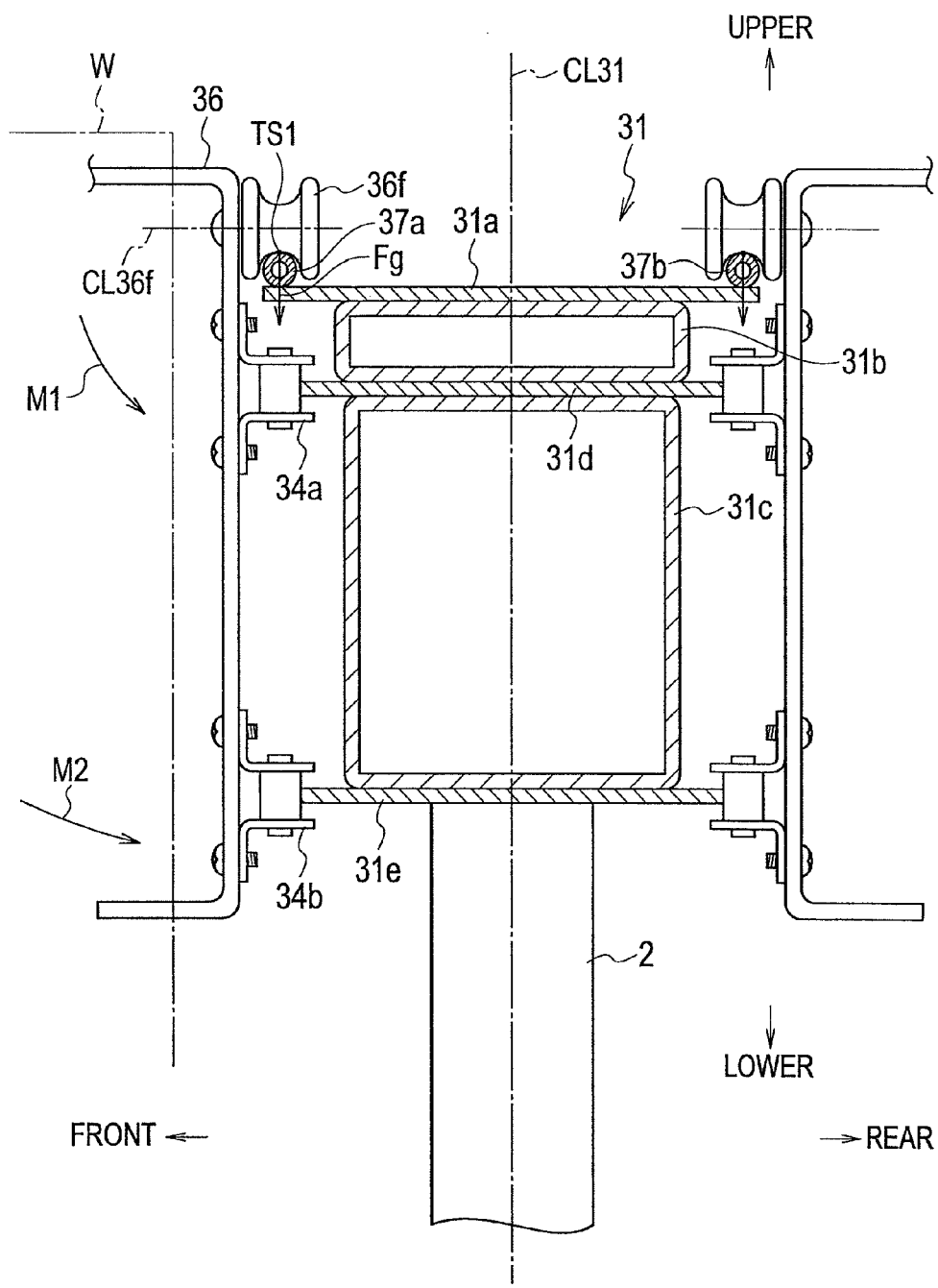
FIG. 3 It is a cross-sectional view taken along a line III-III shown in FIG. 2(c).

As shown in FIG. 3 that is a cross-sectional view taken along a line III-III in FIG. 2(c), the frame 31 has an upper plate 31a, a middle plate 31d, a lower plate 31e, and support bodies 31b and 31c disposed between the plates. These component members are fixed with each other by screws or by welding. Note that the above-explained structure of the frame 31 is one example, and the structure of the frame 31 is not limited to this.

A guide rail 37a is provided at a front side edge of the upper plate 31a, and a guide rail 37b is provided at a rear side edge of the upper plate 31a. The guide rails 37a and 37b are pipe-shaped members. In addition, an idler roller 36f is provided at each upper portion of the holders 36. The idler roller 36f has a concave circumferential surface in conformity with a shape of the guide rails 37a and 37b. A rotational axis CL36f of the idler roller 36f is extends horizontally. The idler rollers 36f rotate on the guide rails 37a and 37b along with the circular movements of the chains 34a and 34b.

By the guide rails 37a and 37b and the idler rollers 36f, postures of the holders 36 are made stable further, and weights of the processed products W held by the holders 36 and own weights of the holders 36 are surely received by the frame 31. Namely, vertically-downward forces Fg due to the weights of the processed products W and the weights of the holders 36 are transferred to the frame 31 via contact points TS1 between the guide rails 37a and 37b and the idler rollers 36f.

Movements of the chain 34a toward a center plane CL31 of the frame 31 are restricted by the middle plate 31d. Similarly, movements of the chain 34b toward the center plane CL31 of the frame 31 are restricted by the lower plate 31e. Therefore, restricted can be swing movements of the holders 36 caused by moments M1 and M2 applied to the chains 34a and 34b with the contact points TS1 as fulcrum points. These restricted swing movements are counter-clockwise swing movements with respect to the holders 36 on a left side in FIG. 3, and clockwise swing movements with respect to the holders 36 on a right side.

The holder(s) 36 can hold the processed product W quite stably even if mass of the processed product W is large, because the chain 34b is provided in addition to the chain 34a and a lower portion of the holder 36 is fixed with the chain 34b, and because the swing movement of the holder 36 due to the moment M2 can be restricted by the frame 31 via the chain 34b.

Note that, if weight of the processed product W is small enough to restrict the swing movement by the upper chain 34a and the middle plate 31d against the moment M1 with no problem in view of strength, the processed product W can be held by the holder 36 adequately without providing the swing movement restriction structure at the lower chain 34b and the lower plate 31e. In addition, the above-explained storage apparatus 51 is used while mounted on a floor via the base 1. However, the storage apparatus may be used while suspended from a beam(s), a ceiling or the like via the support posts 2.

Next, an embodiment of the processed product (stored product) W stored by the storage apparatus 51 will be explained with reference to FIG. 5 and FIG. 6.

Figure 5:
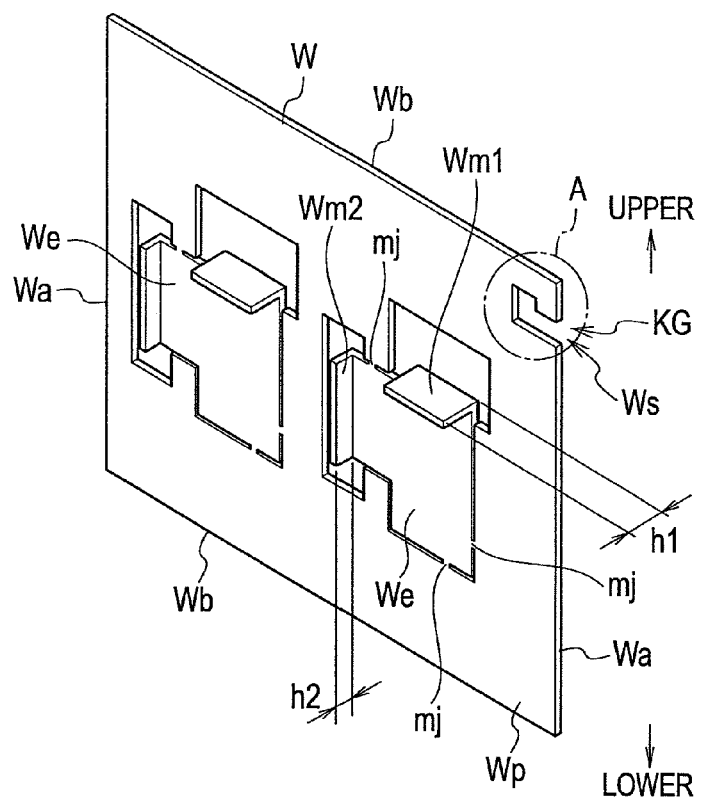
FIG. 5 It is a perspective view of a processed product to be stored in the product storage apparatus.
Figure 6:
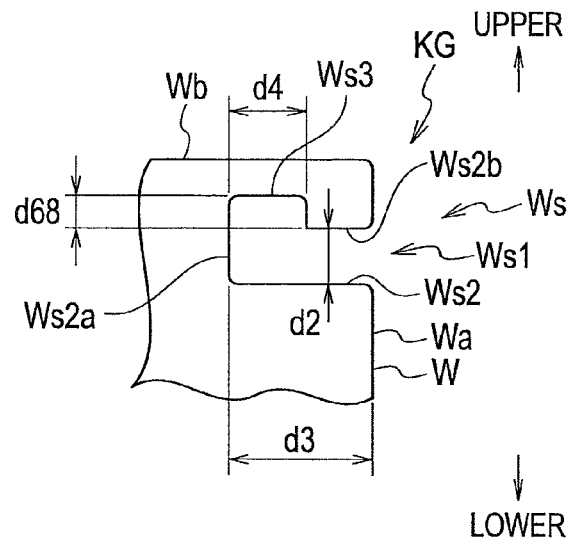
FIG. 6 It is an enlarged view showing a characteristic portion of the processed product.

As shown in FIG. 5, the processed product W is made from a sheet material, and, for example, has a rectangular outline formed by a pair of opposite vertical edges Wa and a pair of opposite horizontal edges Wb. The processed product W is an intermediate product on which one or more intermediary members We to be cut away eventually as products are formed by being laser-processed and bending-processed sequentially. In FIG. 5, shown is the processed product W on which two intermediary members We are formed.

The intermediary member(s) We is cut at its circumference by laser processing while plural remaining micro joints mj, and has bent portions Wm1 and Wm2 bent by bending after the laser processing. Here, between a height h1 of the bent portion Wm1 and a height h2 of the bent portion Wm2 from a main surface Wp of the processed product W, an in equation h2<h1 is satisfied. The intermediary member We becomes a completed product when cut away from the processed product (stored product) W by cutting the micro joints.

An engagement portion KG used for storages in the storage apparatus 51 is formed on a circumferential edge (a corner in the present embodiment) of the processed product W. The engagement portion KG in the present embodiment is a slit Ws. The slit Ws is formed at one corner of the processed product W (an upper right corner in FIG. 5). The slit Ws is formed at the corner on a far side from the ground (an upper side) on the processed product W in a stored posture. For example, the slit Ws is formed by laser processing. As shown in FIG. 6, the slit Ws is formed of a cutout Ws2 horizontally formed with a width d2 and a length d3 and a cutout Ws3, with a width d4 and a height d68, made curved upwardly from a deep portion of the cutout Ws2, and its opened portion Ws1 is located on the vertical edge Wa. A portion located above the cutout Ws2 and located between the cutout Ws3 and the vertical edge Wa forms a claw portion Ws2b.

Figure 7:
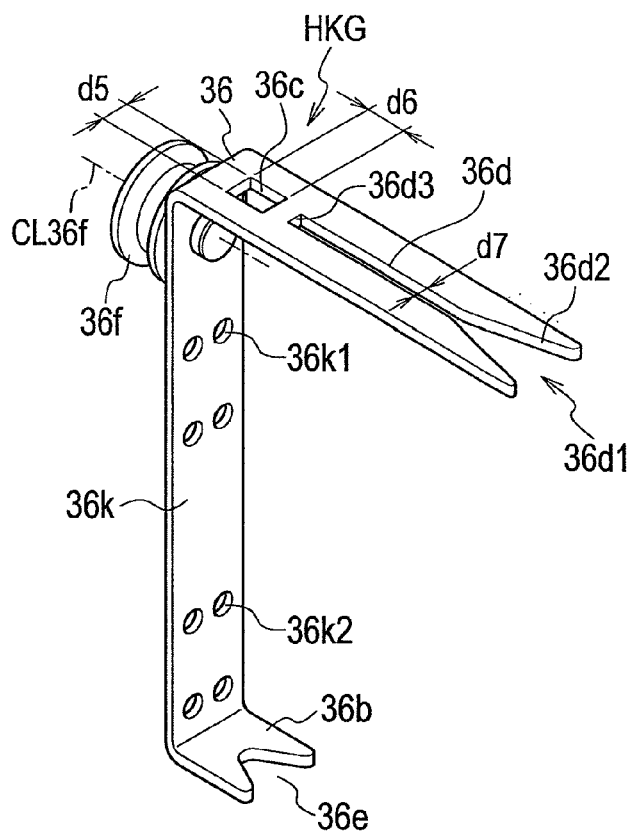
FIG. 7 It is a perspective view of a holder in the product storage apparatus.

Next, the holder(s) 36 will be explained with reference to FIG. 7 and FIG. 8. Since all the holders 36 have an identical configuration, one of the holders 36 will be explained. As shown in FIG. 7, the holder 36 has a base plate 36k extending vertically, a long arm 36a bent from an upper end of the base plate 36k at almost 90°, and a short arm 36b bent from a lower end of the base plate 36k at almost 90° to the same side as a bent side of the long arm 36a. The short arm 36b is shorter than the long arm 36a. On the base plate 36k, formed are holes 36k1 that are fastened together with the bolt holes 35a on the flange 35f of the chain 34a, and holes 36k2 that are fastened together with the bolt holes 35a on the flange 35f of the chain 34b. In addition, the idler roller 36f is rotatably mounded at an upper portion of the base plate 36k.

An engagement receive portion HKG to be engaged with the engagement portion KG of the processed product W is formed on the long arm 36a of the holder 36. The engagement portion KG and the engagement receive portion HKG are engaged with each other by an engagement of a claw and a hole. An engagement hole 36c and an engagement slit 36d are formed at the engagement receive portion HKG. The engagement hole 36c is formed on the long arm 36a near the base plate 36k, and has a rectangular shape with a width d5 and a length d6. In addition, the engagement slit 36d has an opened notch 36d1 formed on an end side of the long arm 36a. A portion of the engagement slit 36d near the engagement hole 36c has a constant width d7. The opened notch 36d1 forms a tapered portion 36d2 widened toward an end of the long arm 36a. The processed product W is inserted into the engagement slit 36d. Therefore, the width d7 is made almost-equal-to or slightly-wider-than a thickness t1 of the processed product W. On the other hand, a notch 36e is formed at an end of the short arm 36b.

Figure 8:
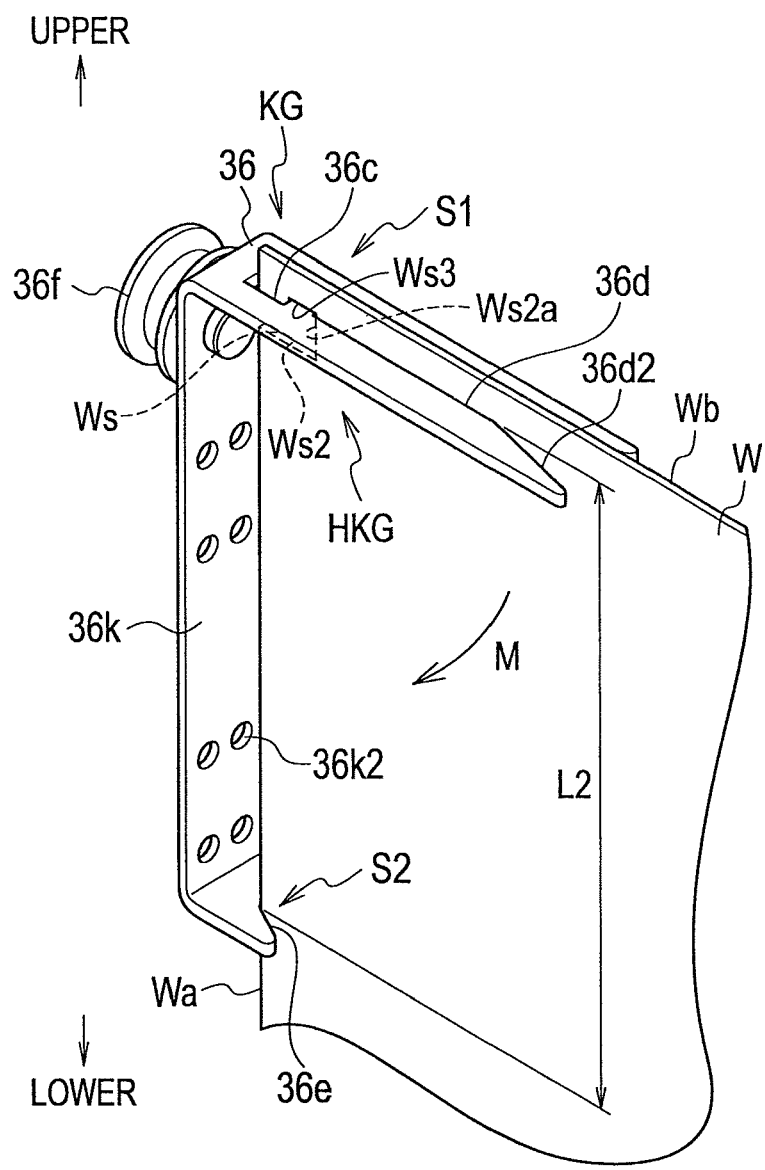
FIG. 8 It is a perspective view of the holder that holds the processed product.
Figure 9:
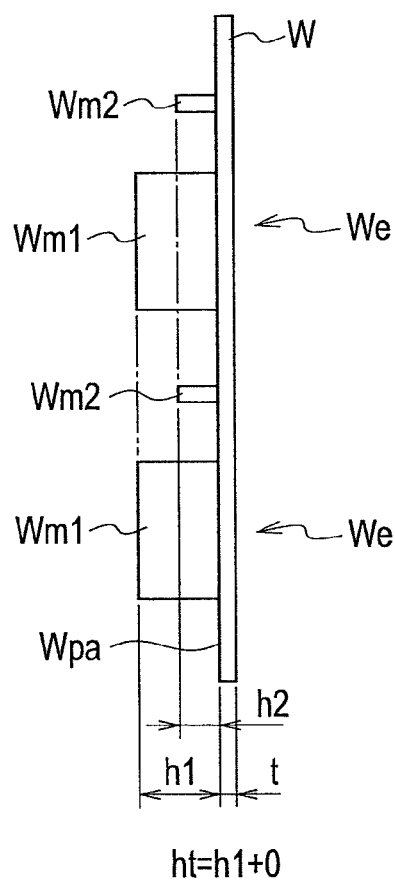
FIG. 9(a) is a side view of the processed product, and FIG. 9 (b) is a side view of a modified example of the processed product.
Figure 9:
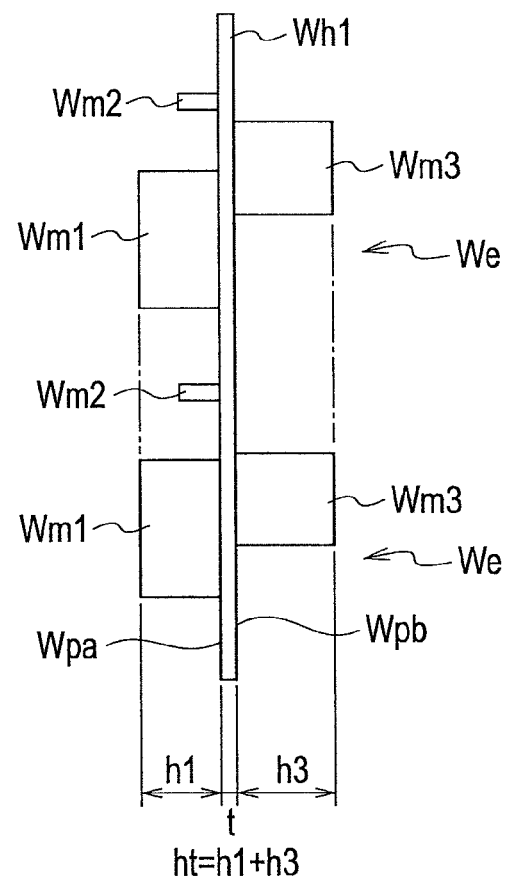
Figure 10:
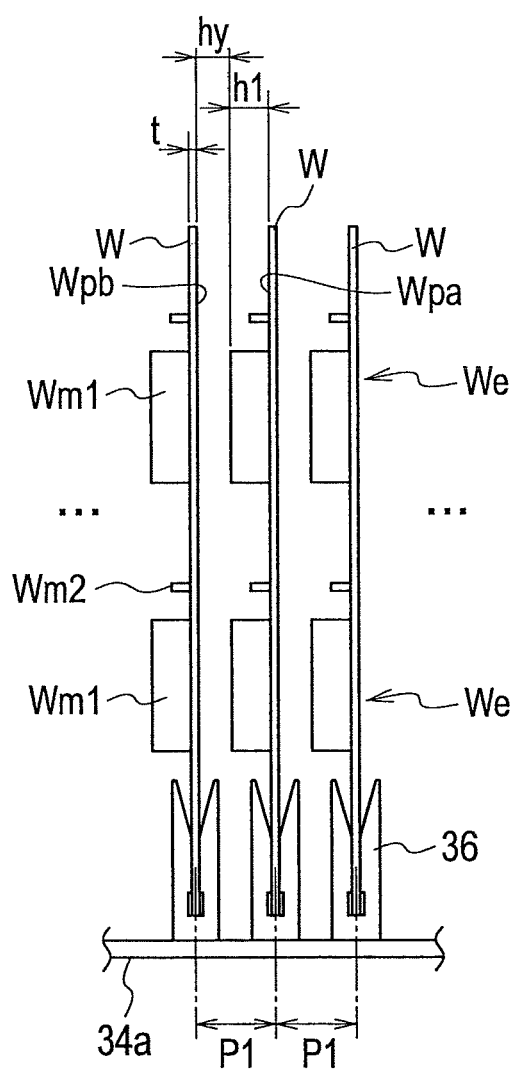
FIG. 10 It is a plan view showing holders that hold the processed products, respectively.

As shown in FIG. 8, the engagement portion KG of the processed product W and the engagement receive portion HKG of the holder 36 are engaged with each other, so that the processed product W is held by the holder 36. To make the processed product W held by the holder 36, the processed product W is inserted into the engagement slit 36d of the holder 36 fixed with the chains 34a and 34b. Since the tapered portion 36d2 is formed in the engagement slit 36d, the processed product W can be inserted into the engagement slit 36d easily. The processed product W is inserted until a deepest portion Ws2a (see FIG. 6) of the cutout W2 and a deep end 36d3 (see FIG. 7) of the engagement slit 36d are contacted with each other. The claw portion Ws2b is engaged with the engagement hole 36c, so that a movement in an extending direction of the long arm 36a and a downward movement are restricted. Here, since the length d6 (see FIG. 7) of the engagement hole 36c is made almost-equal-to or slightly-shorter-than a width (d3−d4) of the claw portion Ws2b, the processed product W is held by the holder 36 in a state where its chattering in an extending direction of the long arm 36a is restricted. A lower portion of the processed product W beneath the engagement portion KG is also held by the notch 36e.

As shown in FIG. 8, a moment M is generated in the processed product W with an engaged portion S1 as a fulcrum point. A swing movement of the processed product W due to the moment M is restricted by the engaged portion S1 and a contacted portion S2 of the notch 36e of the short arm 36b positioned lower than the long arm 36a by a distance L2 and the vertical edge Wa of the processed product W. Since the notch 36e is formed to have a V-shape, the vertical edge Wa of the processed product W contacts with a deepest portion of the notch 36e smoothly. The processed product W is held by the holder 36 at two positions vertically distanced with each other, the engaged portion S1 and the contacted portion S2. Therefore, even if a weight of the processed product W is large, the processed product W can be held by the holder 36 stably.

Next, the pitches P1 of the holders 36 will be explained with reference to FIG. 9(a) to FIG. 12. The pitch(es) P1 is set as explained below. With respect to each of the processed products W, Wh1 . . . in which a bent portion(s) is formed and that is to be held by the holder 36, calculated is a total bent height ht that is a sum of a maximum bent height hamax on one surface Wpa and a maximum bent height hbmax on another surface Wpb. The pitch P1 is set larger than a value calculated by adding a thickness t of the processed product W to a minimum total bent height htmin among the calculated total bent heights ht. Preferably, the pitch P1 is set as small as possible in a range in which this condition (P1>(htmin+t)) is satisfied and there is no problem for a practical use.

A processed product W shown in FIG. 9(a) is the processed product W shown in FIG. 5, and each of the intermediary members We has the bent portion Wm1 with a bent height h1 on the one surface Wpa and the bent portion Wm2 with a bent height h2 (h2<h1) on the one surface Wpa. The maximum bent height hamax of the processed product W is h1, and the maximum bent height hbmax is 0 (zero), so that the total bent height ht of the processed product W is h1.

On the other hand, in a processed product Wh1 shown in FIG. 9(b), compared with the processed product W shown in FIG. 9(a), each of the intermediary members We further has a bent portion Wm3 with a bent height h3 (h1<h3) on the other surface Wpb. Since the maximum bent height hamax of the processed product Wh1 is h1 and the maximum bent height hbmax is h3, so that the total bent height ht of the processed product Wh1 is h1+h3. When holding the processed products W and Wh1 by the holders 36, the minimum total bent height htmin is h1 (<(h1+h3)). Therefore, the pitch P1 is set so that P1>(h1+t) is satisfied. Preferably, the pitch P1 is set as small as possible in a range in which this condition (P1>(h1+t)) is satisfied and there is no problem for a practical use.

In order to improve storage efficiency for holding the processed products W by the holders 36, it is desired to set the pitch P1 to a value as close as possible to (htmin+t). However, the pitch P1 is practically set by adding a gap by to (htmin+t) as a safety margin in consideration of contacts of the neighboring processed products W with each other due to wobbling of the held processed products W and dispersion of dimensions and attached positions of the held processed products W. Namely, the pitch P1 is set as P1=htmin+t+hy (see FIG. 10).

Next, explained will be a method for holding the processed products Wh1 having the large total bent height ht=(h1+h3) by the holders 36 fixed with the chains 34a and 34b with the pitch P1 set based on the processed products W as explained above. As shown in FIG. 9(b), the processed product Wh1 has a total width hz=h1+t+h3, and P1<hz<(2×P1). In this case, when the processed product Wh1 is held by the holder 36 next to the holder 36 that already holds the processed product Wh1, the bent portion Wm1 of one of the processed products Wh1 and the bent portion Wm3 of another of the processed product Wh1 may contact with each other and thereby they may be damaged. Note that, although the above explanations are made with the total width hz in consideration of a suspended state of the processed product(s) Wh1, the hz may be recognized as thickness or height when the processed product Wh1 is oriented horizontally.

Figure 11:
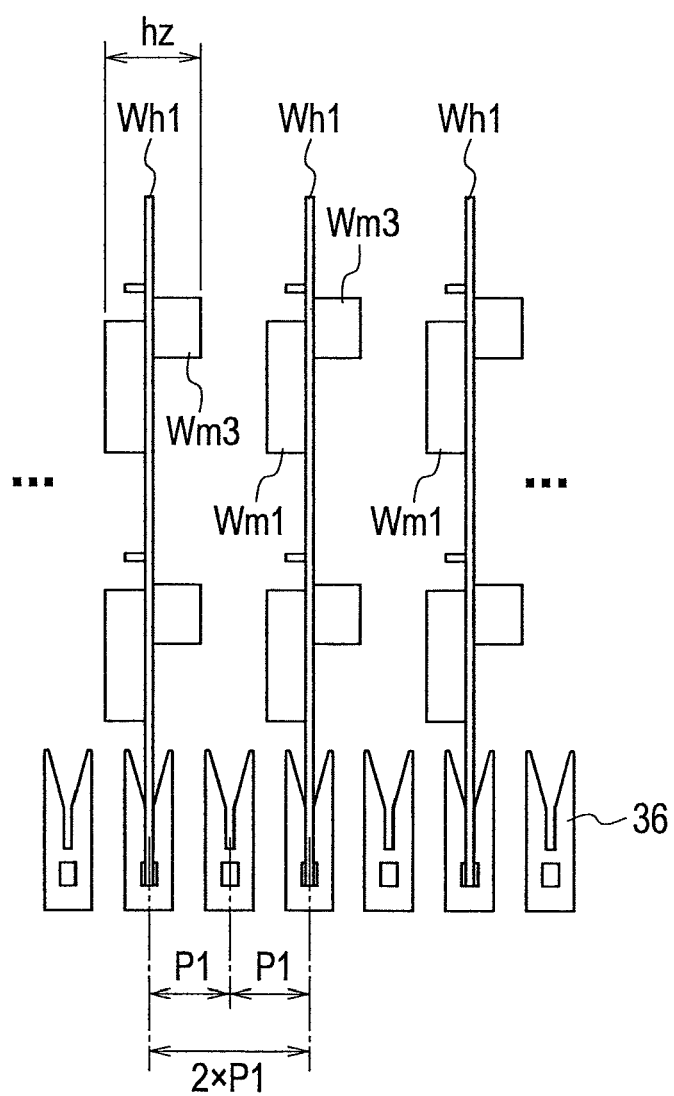
FIG. 11 It is a plan view showing holders some of which hold the modified examples of the processed product, respectively.
Figure 12:
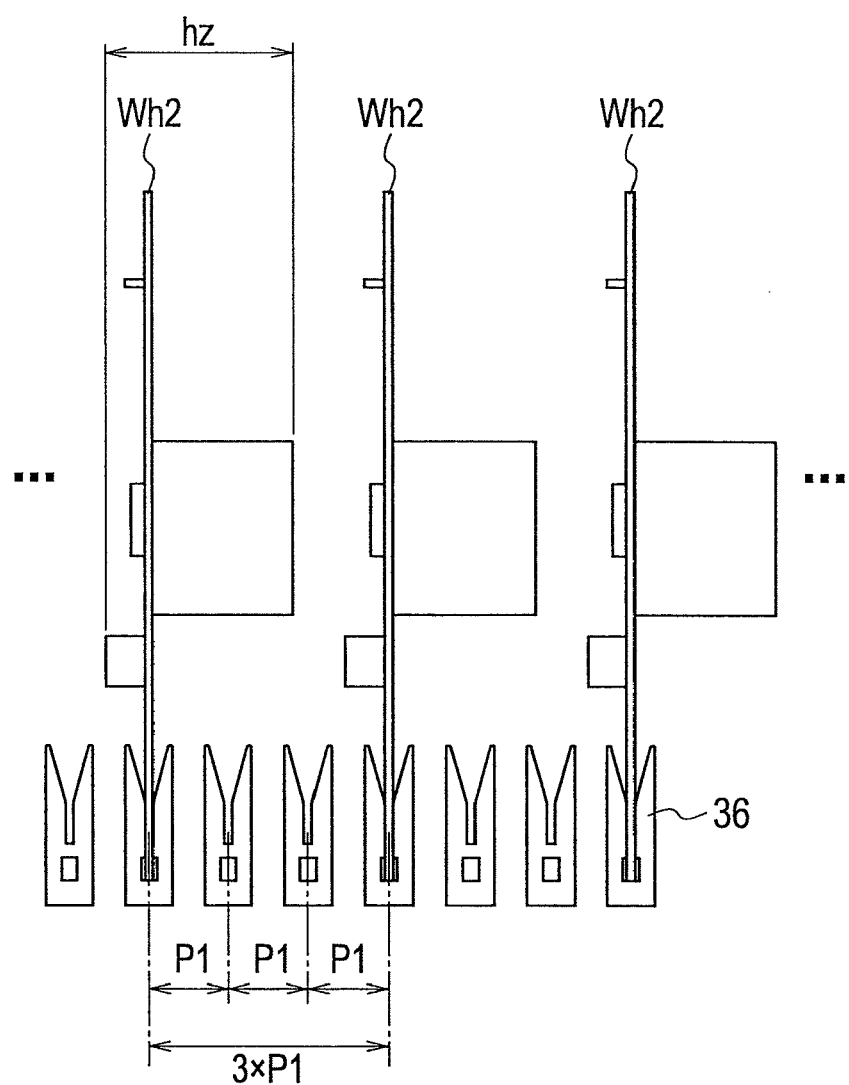
FIG. 12 It is a plan view showing holders some of which hold other modified examples of the processed product, respectively.

Note that, even if the bent portion Wm1 and the bent portion Wm3 are not contacted with each other when the processed products Wh1 are held at the neighboring holders 36, they may be damaged when installing the processed product(s) Wh1 to the holder(s) 36 or removing the processed product(s) Wh1 from the holder(s) 36. Therefore, as shown in FIG. 11, the processed product Wh1 is held in every two holders 36. According to this method, pitch modifications of the holders 36 are not required, and the processed products Wh1 can be held by the holders 36. In addition, in a case of processed products Wh2 with a total width hz satisfies (2×P1) <hz<(3×P1), the processed product Wh2 is held in every three holders 36 as shown in FIG. 12. According to this method, pitch modifications of the holders 36 are not required, and the processed products Wh2 can be held by the holders 36.

Namely, in a case for holding processed products Whn with a total width hz satisfies ((n−1)×P1)<hz<(n×P1) (n is a natural number) by the holders 36, a processed product Whn is held in every n pieces of the holders 36. The (n−1) pieces of the holders 36 between the holders 36 that hold the processed products Whn do not hold the processed product Whn. Namely, the natural number n is determined so that a mathematical product (P1×n) of the pitch P1 and the natural number n becomes a minimum value larger than the total width hz of the processed product Whn. According to this method, when storing a single type of processed products Whn in the storage apparatus 51, they can be stored with high space efficiency without being limited by the total width hz. In addition, also when storing plural types of processed products Whn having different total widths hz, the plural types of processed products Whn can be held in every n pieces of the holders 36 according to the total width hz. Therefore, even when storing the plural types of processed products Whn, they can be stored with high space efficiency.

Figure 13:
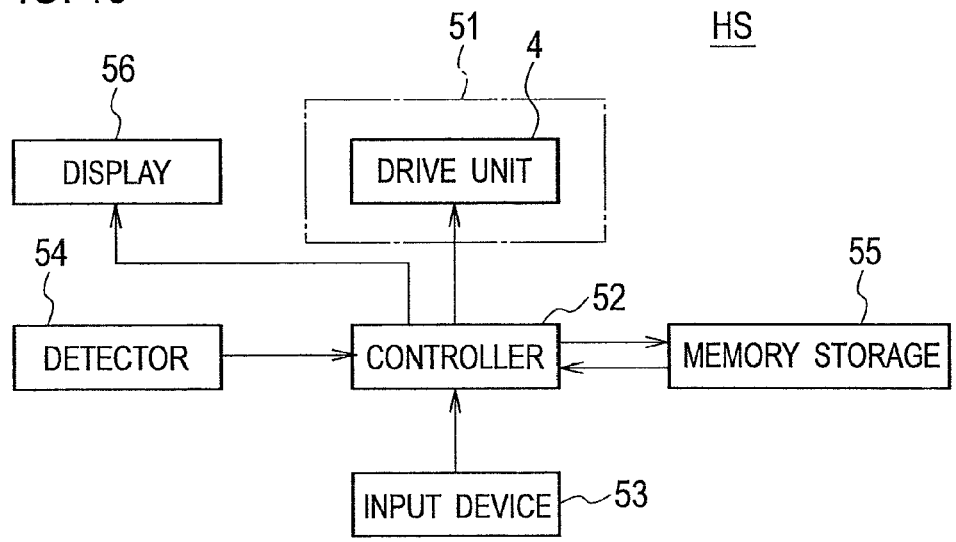
FIG. 13 It is a block diagram of a storage system that includes the product storage apparatus.

As shown in FIG. 13, a storage system HS involving a control system for operations of the storage apparatus 51 includes a controller 52 that controls the drive unit 4 of the storage apparatus 51, an input unit 53 into which an operator inputs commands for the controller 52, a detector 54 that detects positions of the holders 36, a memory storage 55 that stores various data such as information of the pitch P1, information of the total widths hz of the processed products W and control programs that are required for controls by the controller 52, and a display 56 that displays various information based on commands from the controller 52.

A type of the detector 54 is not limited, but may take various configurations as long as it can detect positions of the holders 36. For example, the detector 54 may be a photoelectric sensor. Alternatively, it may be a camera and an image processing unit that processes images taken by the camera. Alternatively, it may be an encoder provided at the drive unit 4. In the above storage system HS, the controller 52, the input unit 53, the detector 54, the memory storage 55 and the display 56 are disposed outside the storage apparatus 51, but at least one (or all) of them may be implemented into the storage apparatus 51.

Figure 14:
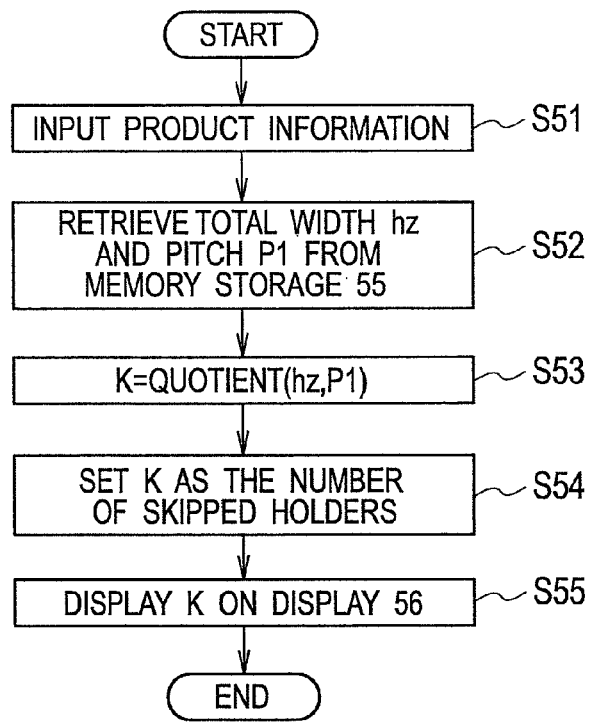
FIG. 14 It is a flowchart showing operations of the storage system.

It may be determined by an operator that the processed product W is held in every how many pieces of the holders 36, but the controller 52 may be configured to determine it. A flowchart of a determination process in this case is shown in FIG. 14.

First, product information (e.g. product number(s)) required for specifying a processed product(s) W is input into the input unit 53 by an operator (step S51). Subsequently, the controller 52 refers various data stored in the memory storage 55 to retrieve the pitch P1 of the storage apparatus 51 and the total width hz of the processed product W specified based on the product information input in step S51 (step S52). Subsequently, the controller 52 calculates hz/P1 and thereby obtains a whole number K by rounding down to the nearest whole number. Namely, it executes a function QUOTIENT (hz,P1)=K (step S53). Subsequently, the controller 52 set K as the number of holders 36 prevented from holding the processed products W, i.e. the number of skipped holders (step S54). For example, when a processed product W is held in every three holders 36, the number of skipped holders K=2. Subsequently, the controller 52 displays the set value K on the display 56 (step S55).

When the operator installs the processed products W to the holders 36 (or removes them from the holders 36), the controller 52 controls the drive unit 4 to move the holders 36 at a speed operable by the operator. The operator installs the processed products W to the holders 36 based on the value K displayed on the display 56. Alternatively, the controller 52 may control the drive unit 4 to move the holders 36 intermittently according to the value K. Specifically, the controller 52 controls the drive unit 4 to stop the chains 34a and 34b for a predetermined time after moving them by a predetermined distance corresponding to the holders 36 that are to hold the processed products W, and then move them again by the predetermined distance after the predetermined time has elapsed. The distance for a single movement is n times as long as the pitch P1 (n is a natural number), and (n−1)=K. The stopped time can be determined arbitrarily in consideration of the operation. According to this control, the operator can install the processed products W to (remove them from) every n pieces of the holders 36 that are stopped at an operational position. In this case, the controller 52 controls the drive unit 4 based on the positions of the holders 36 detected by the detector 54.

Figure 15:
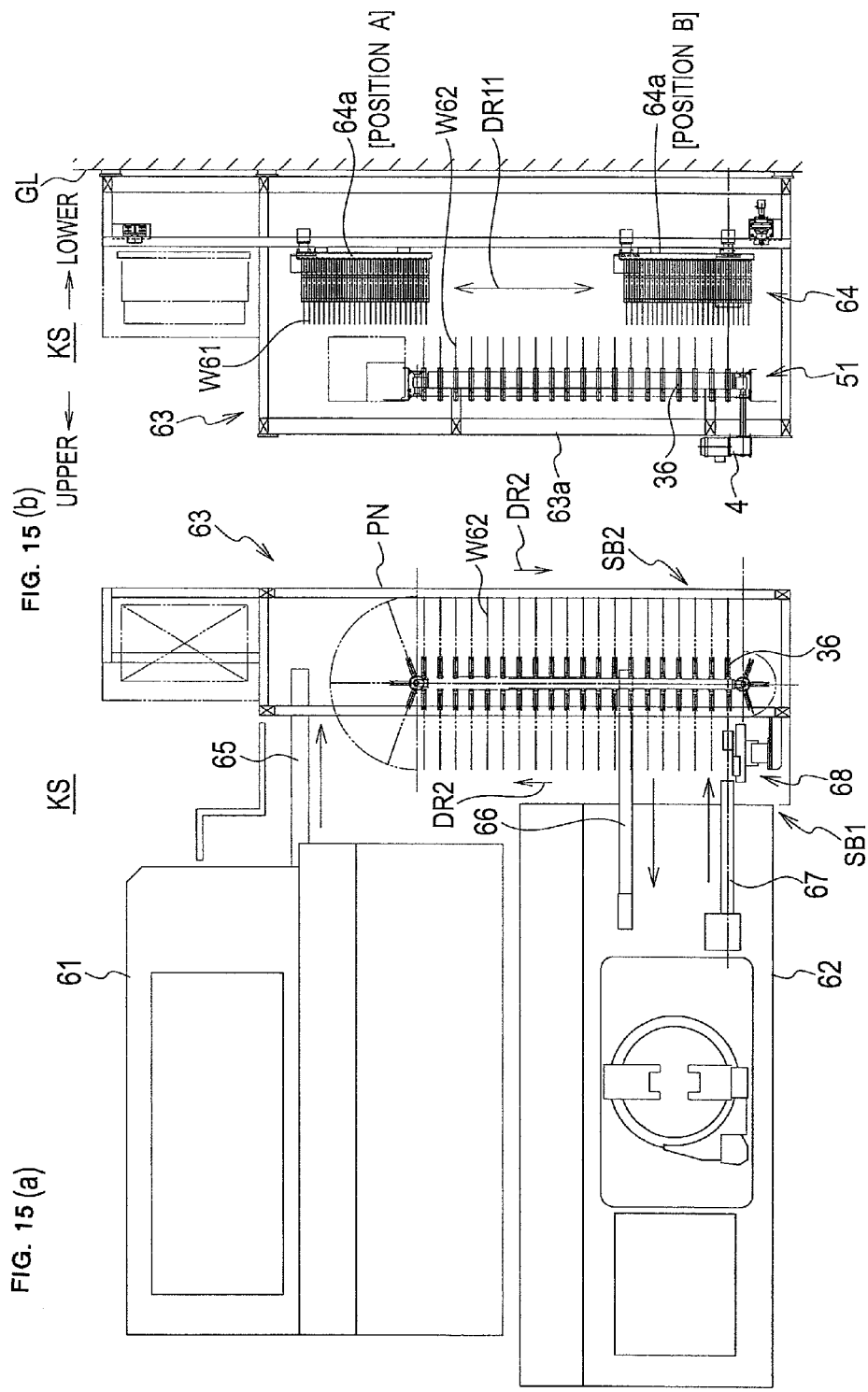
FIG. 15(a) is a front plan view.
FIG. 15(b) is a plan front view of an embodiment of a processing system to which the storage system is applied.

In the above-explained storage system HS, the processed products W are installed to the holder 36 manually by the operator. Next, with reference to FIG. 15 to FIG. 19 (b), explained will be an embodiment of a processing system KS to which the storage apparatus 51 is applied so that the processed products W are installed to the holders 36 automatically. In the processing system KS, a temporal storage apparatus 63 (see FIG. 15) including the storage apparatus 51 is disposed on an carry-out side of a processing machine(s) and used for temporal storages prior to supplies to a next process.

As shown in FIGS. 15(a) and (b), the processing system KS includes a laser processing machine (first processing machine) 61 that laser-processes processed products (stored products) W in a vertical posture, a bending machine (second processing machine) 62 that bends the processed products W processed by the laser processing machine 61, and the temporal storage apparatus 63 that stores the processed products W temporarily. The temporal storage apparatus 63 is applied to a so-called laser and bending combined machine.

The temporal storage apparatus 63 includes a tray storage apparatus (first storage apparatus) 64 that temporarily stores processed products W61 (see FIG. 15(b)) processed by the laser processing machine 61 on its tray 64a, and the above-explained, storage apparatus (second storage apparatus) 51 that temporarily stores processed products W62 (see FIGS. 15(a) and (b)) processed by the bending machine 62. The storage apparatus 51 is disposed above the tray storage apparatus 64, and the temporal storage apparatus 63 has a vertical two-stage structure composed of both of the apparatuses 64 and 51. In addition, the temporal storage apparatus 63 also includes a panel(s) PN (see FIG. 15(a)) that covers the tray storage apparatus 64 and the storage apparatus 51. The panel PN covers at least one of sides of the tray storage apparatus 64 and the storage apparatus 51.

The tray 64a of the tray storage apparatus 64 can stores the plural processed products W61 in a vertical posture. In addition, the tray 64a can be moved shuttlewise between a "position A" on a side of the laser processing machine 61 and a "position B" on a side of the bending machine 62 as shown by an arrow DR11 in FIG. 15(b). Although two trays 64a is shown in FIG. 15(b) for explanations, there is only one actually. The storage apparatus 51 is provided in a suspended state, and the drive unit 4 is disposed at an upper portion of the temporal storage apparatus 63 (the storage apparatus 51) (see FIG. 16).

The temporal storage apparatus 63 cooperates with the processing machines 61 and 62 to store workpieces (the processed products W61 and W62). The processed products W61 processed by the laser processing machine 61 are sequentially installed on the tray 64a at the position A by a carry-out device 65. When the number of the processed products W61 installed on the tray 64a reaches a predetermined number, the tray 64a is moved to the position B. The processed products W61 moved to the position B are supplied to the bending machine 62 one by one by a carry-in device 66 while each of them is still in a vertical posture. All of the processed products W61 on the tray 64a are carried out, the tray 64a is moved to the position A to wait installations of the processed products W61.

The processed product W61 is delivered, as the processed product W62, from a carry-out device 67 to a reception unit 68 after being bent by the bending machine 62, and then lifted up to an upper stage by the reception unit 68 of the storage apparatus 51 (the temporal storage apparatus 63) to be held by the holder 36. The holders 36 are moved by the drive unit 4 along a direction indicated by arrows DR2 shown in FIG. 15(a), FIG. 16 and FIG. 17(c). In FIG. 15(a) to FIG. 17(c), the processed product W62 are held by the holders one by one. Note that there may be a case where the processed product W is held in every predetermined number of pieces of the holders 36 according to the total width hz of the processed product W as explained above.

Figure 16:
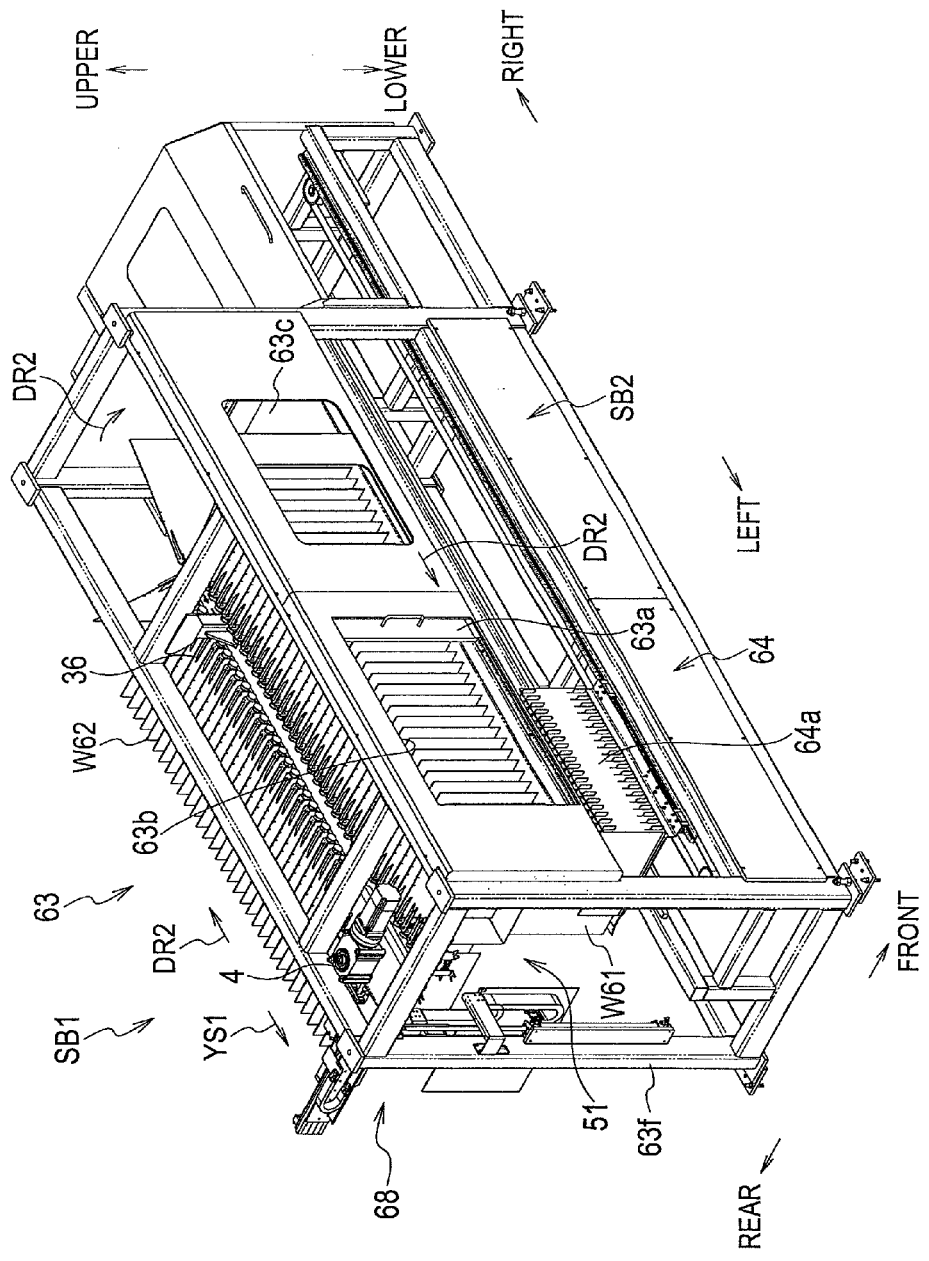
FIG. 16 It is a perspective view of a temporal storage apparatus in the processing system.
Figure 17:
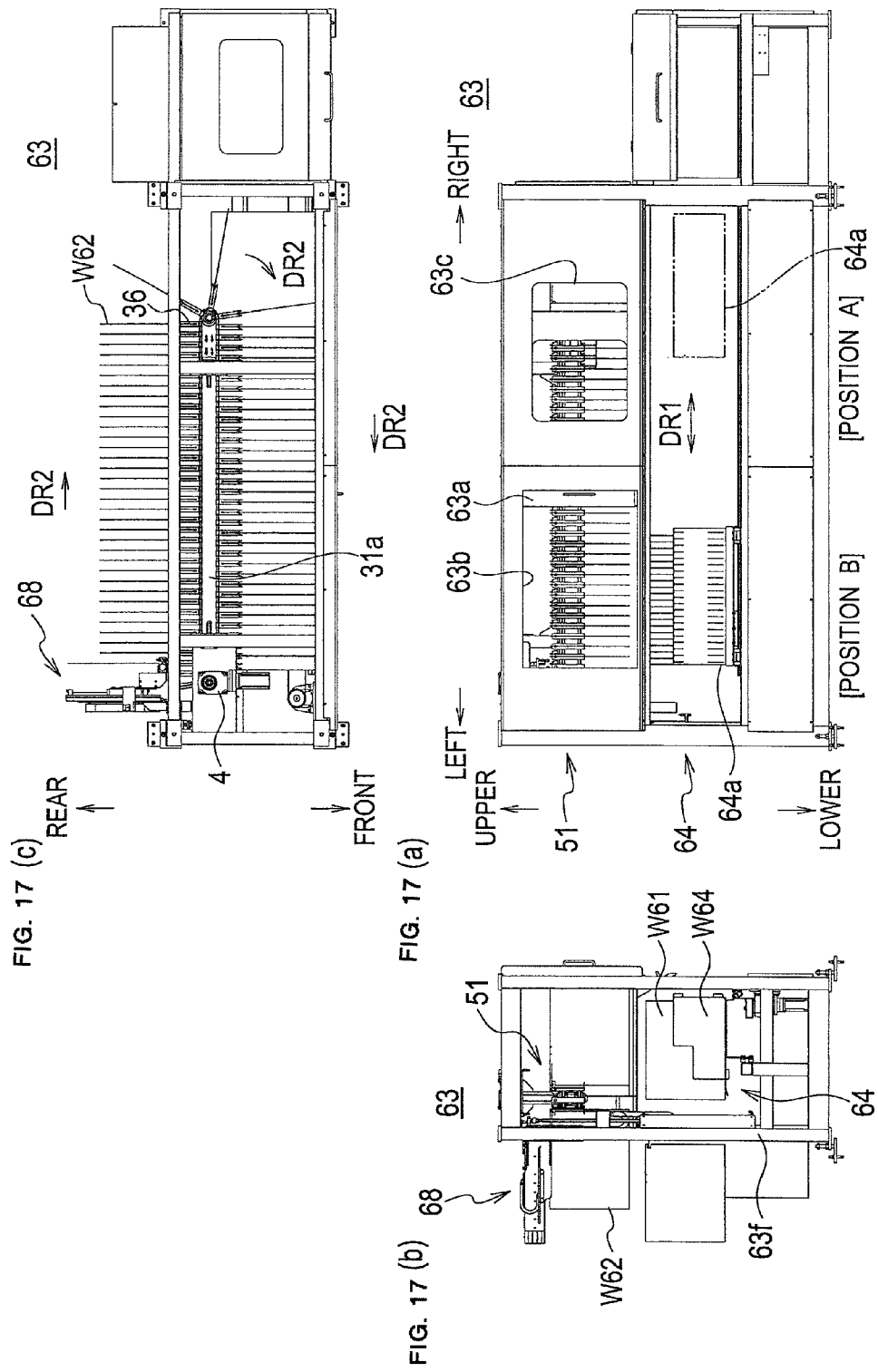
FIG. 17(a) is a front view.
FIG. 17(b) is a side view.
FIG. 17(c) is a plan view of the temporal storage apparatus.

As shown in FIG. 16, the processed products W62 are installed to the holders 36 at one side SB1 of the temporal storage apparatus 63 (the storage apparatus 51), and then carried out from another side SB2. On the other side SB2, an opening 63b as a carry-out opening for the processed products W62 and a slide door 63a for opening or closing the opening 63b are provided (see FIG. 16 and FIG. 17(a) to FIG. 17(c)). The slide door 63a is generally shut to close the opening 63b. However, when the processed products W62 held by the holders 36 reach the other side SB2 after being moved along a track (path), the slide door 63a is opened by an operator to carry out the processed products W62 through the opening 63b. The carried-out processed products W62 are supplied to a next process.

Note that a glass or transparent acrylic panel is installed in the slide door 63a to make the inside visible. In addition, on a panel on a right side of the opening 63b, provided is a window 63c into which a glass or transparent acrylic panel is installed to make the inside visible.

Figure 18:
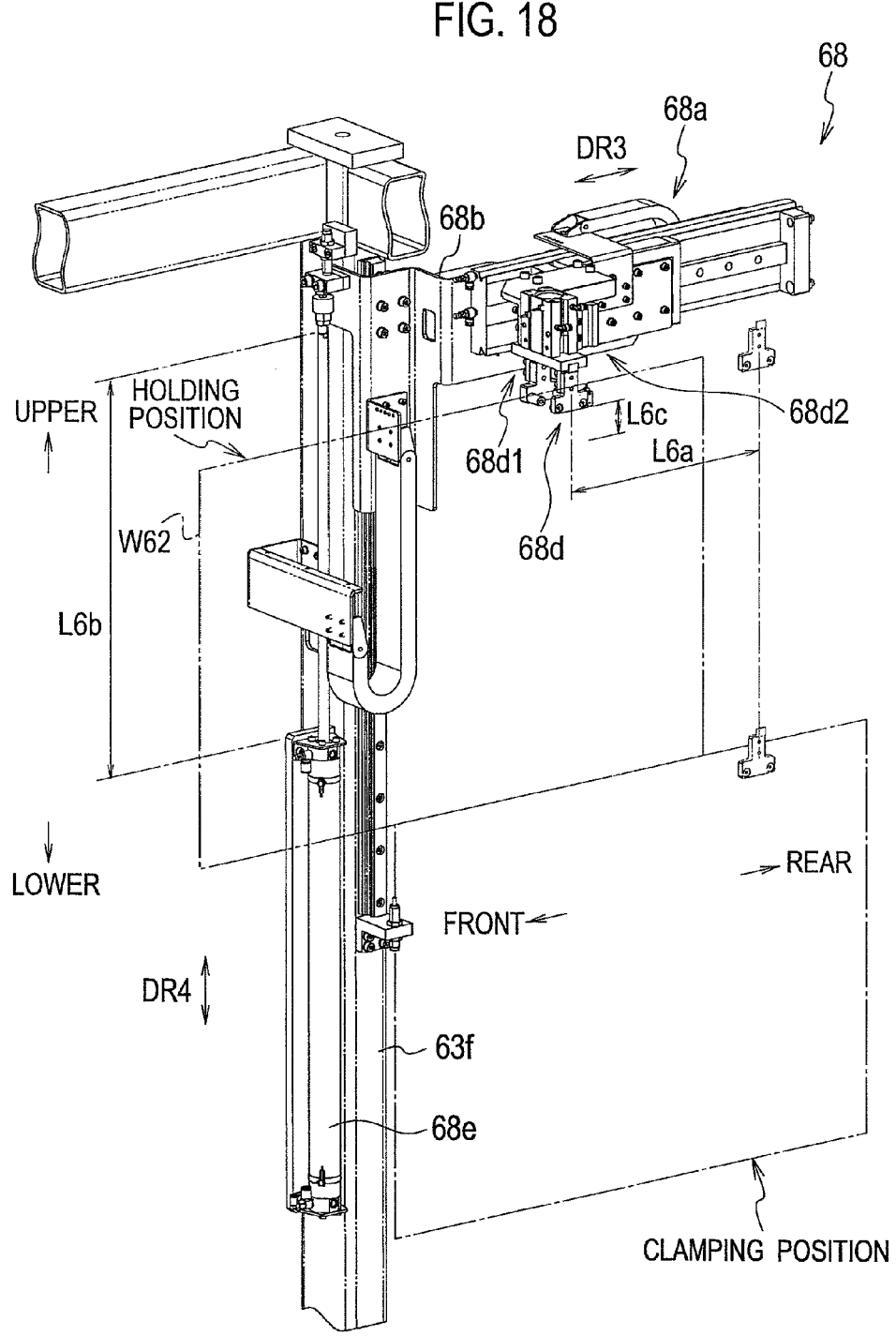
FIG. 18 It is a perspective view of a reception unit in the temporal storage apparatus.

As shown in FIG. 18, the reception unit 68 is fixed with a frame 63f (see FIG. 16 and FIG. 17(c)) of the temporal storage apparatus 63. The reception unit 68 is configured to have a clamper 68d that clamps the processed product W62, a first cylinder 68a that moves the clamper 68d in a rear-front direction (an arrow DR3), a base 68b that supports the clamper 68d slidably, and a second cylinder 68e that moves the base 68b in an upper-lower direction (an arrow DR4). A stroke of the clamper 68d in the rear-front direction by the first cylinder 68a is L6a. A stroke of the base 68b in the upper-lower direction by the second cylinder 68e is L6b.

In addition, the clamper 68d is moved on the base 68b in the upper-lower direction by a third cylinder 68d2. The third cylinder 68d2 is supported by the base 68b, and moved on the base 68b in the rear-front direction by the first cylinder 68a together with the clamper 68d. A stroke of the clamper 68d in the upper-lower direction by the third cylinder 68d2 is L6c. The stroke L6c is set at least larger than the height d68 of the processed product W shown in FIG. 6 and the processed product W62 shown in FIGS. 19(a) and (b). The height d68 is a vertical length between a lower end of the claw portion Ws2b and an upper side of the cutout Ws3. The second cylinder 68e is disposed at a lower portion of the reception unit 68.

In a state where the clamper 68d is positioned on a rear side, the processed product W62 is supplied to a clamping position shown in FIG. 18 by the carry-out device 67 of the bending machine 62. The clamper 68d clamps the processed product W62 supplied to the clamping position. The processed product W62 clamped by the clamper 68d is carried upward by an elevation of the base 68b made by the second cylinder 68e, and then carried to a holding position shown in FIG. 18 by a slide (the stroke L6a) of the clamper 68d made by the first cylinder 68a. These movements of the processed product W62 are synchronized with circular movements of the holders 36, and, when a holder 36 by which the processed product W62 is to be held reaches a position associated with the reception unit 68, the processed product W62 is inserted into the engagement slit 36d of the holder 36 by the reception unit 68 (a slide of the clamper 68 by the first cylinder 68a).

The engagement portion KG of the processed product W62 just after inserted into the engagement slit 36d is in a state shown in FIG. 19(a). Namely, the deepest portion Ws2a of the cutout Ws2 on the processed product W62 is contacted with the deep end 36d3 of the engagement slit 36d on the holder 36, but the claw portion Ws2b is positioned at a vertical position without being inserted into the engagement hole 36c. Here, the clamper 68d is moved downward by the third cylinder 68d2, and thereby the processed product W62 is moved downward. As a result, as shown in FIG. 19(b), the claw portion Ws2b is inserted into the engagement hole 36c, and thereby the processed product W62 is held by the holder 36.

The actions of the reception unit 68 are controlled by the controller 52 (see FIG. 13). Namely, it is determined by the controller 52 to make the processed product W62 held by which of the holders 36. Since the controller 52 controls the drive unit 4 and the reception unit 68 synchronously based on this determination, reliable and stable actions of the temporal storage apparatus 63 (the storage apparatus 51) without useless actions and false actions (holding by an improper holder 36) can be made.

As explained above, the processed product(s) W62 automatically held by the holder(s) 36 is moved to the other side SB2 on the track (path) along the chains 34a and 34b. The processed product(s) W62 moved to the other side SB2 is carried out by an operator at an appropriate time. Similarly, this carry-out action may be automated by a carry-out device (not shown).

According to the above-explained processing system KS, the processed products W61 processed by the laser processing machine 61 in the former process are temporarily stored at the tray storage apparatus 64 at the lower stage and the processed products W62 processed by the bending machine 62 in the latter process are temporarily stored at the storage apparatus 51 at the upper stage, so that the processed products W (W61, W62) can be stored with high space efficiency. In addition, since the processed products W62 can be stored collectively on the track (path) in the temporal storage apparatus 63 (the storage apparatus 51) during a time period from installation operations of the processed product W62 to the holders 36 from the one side SB1 of the temporal storage apparatus 63 to carry-out operations of the processed product W62 from the holders 36 on the other side SB2, the processed products W62 can be stored temporarily with extremely high space efficiency without wasting spaces, according to the processing system KS.

Note that, in the temporal storage apparatus 63 of the above-explained processing system KS, the vertical two-stage structure composed of the storage apparatus 51 and the tray storage apparatus 64 is adopted. However, a temporal storage apparatus 163 in which a vertical two-stage structure composed of two storage apparatuses 51 are adopted may be used. An embodiment of a processing system KSA including the temporal storage apparatus 163 will be explained with reference to FIGS. 20(a) and (b).

As shown in FIG. 20(b), the temporal storage apparatus 163 includes a storage apparatus (first storage apparatus) 51B at a lower stage and a storage apparatus (second storage apparatus) 51T at an upper stage. The temporal storage apparatus 163 includes the storage apparatus 51B at the lower stage for temporarily storing the processed products W61 processed by the laser processing machine 61 and the storage apparatus 51T at the upper stage for storing the processed products W62 processed by the bending machine 62, and the temporal storage apparatus 163 has a vertical two-stage structure composed of the storage apparatuses 51B and 51T. In addition, the temporal storage apparatus 163 also includes a panel(s) PN (not shown: equivalent to the panel(s) PN in the above-explained temporal storage apparatus 63) surrounding the storage apparatuses 51B and 51T. The panel PN covers at least one of sides of the storage apparatuses 51B and 51T. The storage apparatus 51T is provided in a suspended state, and a drive unit 4T (not shown: equivalent to the drive unit 4 in the above-explained temporal storage apparatus 63) is disposed at an upper portion of the temporal storage apparatus 163 (the storage apparatus 51T). The storage apparatus 51B is mounded on a floor surface G, and a drive unit 4B (not shown: equivalent to the drive unit 4 shown in FIG. 1) is disposed at an upper portion of the storage apparatus 51B.

The storage apparatus 51B has plural holders 36B, and stores the processed products W61. The storage apparatus 51T has plural holders 36T, and stores the processed products W62. The temporal storage apparatus 163 cooperates with the processing machines 61 and 62 to store workpieces (the processed products W61 and W62). As shown in FIGS. 20(a) and (b), the processed products W61 processed by the laser processing machine 61 are sequentially installed on the holders 36B of the lower-stage storage apparatus 51B at a position X by a carry-out device 165. The holders 36B are circulated along a track (path) (see arrows DR5 in FIG. 20(a)). The circulated processed products W61 are supplied to the bending machine 62 one by one at a position Y by a carry-in device 166 while each of them is still in a vertical posture.

The processed product W61 is delivered, as the processed product W62, from a carry-out device 67 to a reception unit 68 of the storage apparatus 51T (the temporal storage apparatus 163) after being bent by the bending machine 62, and then lifted up to an upper stage by the reception unit 68 to be held by the holders 36T. The holders 36B and 36T are moved by the drive units 4B and 4T independently from each other along a direction indicated by the arrows DR5. In FIGS. 20(a) and (b), the processed products W61 and W62 are held by the holders 36B and 36T one by one. Note that there may be a case where the processed product W61 (W62) is held in every predetermined number of pieces of the holders 36B (36T) according to the total width hz of the processed product W61 (W62) as explained above.

The processed products W62 are installed to the holders 36T at one side SB1 of the temporal storage apparatus 163 (the storage apparatus 51T), and then carried out from another side SB2. On the other side SB2, an opening 163b as a carry-out opening for the processed products W62 and a slide door 163a for opening or closing the opening 163b are provided (see FIG. 20(b)). The slide door 163a is generally shut to close the opening 163b. However, when the processed products W62 held by the holders 36T reach the other side SB2 after being moved along the track (path), the slide door 163a is opened by an operator to carry out the processed products W62 through the opening 163b. The carried-out processed products W62 are supplied to a next process.

According to the above-explained processing system KSA, the processed products W61 processed by the laser processing machine 61 in the former process are temporarily stored at the storage apparatus 51B at the lower stage and the processed products W62 processed by the bending machine 62 in the latter process are temporarily stored at the storage apparatus 51T at the upper stage, so that the processed products W (W61, W62) can be stored with high space efficiency. In addition, since the processed products W (W61 and W62) can be stored collectively on the tracks (paths) in the temporal storage apparatus 163 (the storage apparatuses 51B and 51T) during a time period from installation operations of the processed product W62 to the holders 36B on the one side SB1 of the temporal storage apparatus 163 to carry-out operations of the processed product W62 from the holders 36T on the other side SB2, the processed products W (W61 and W62) can be stored temporarily with extremely high space efficiency without wasting spaces, according to the processing system KSA.

In addition, in the temporal storage apparatus 163 of the processing system KSA, the vertical two-stage structure composed of the two storage apparatuses 51B and 51T is adopted. Since the processed products W61 and W62 are stored by the circularly moved holders 36B and 36T in the two storage apparatuses 51B and 51T, respectively, waiting time such as the moving time of the tray 64a in the above-explained temporal storage apparatus 63 is not required. Therefore, it is possible to absorb differences of processing times in the two processing machines 61 and 62 and so on, and thereby favorable takt time without wasting time can be set.

The present embodiment is not limited to the configurations and the processes in the above-explained embodiments, and can be modified within a scope of the present invention.

The processing machines in the processing system KS or KSA are not limited to a laser processing machine and a bending machine. In addition, combination of the plural processing machines is not limited to combination of a laser processing machine and a bending machine. In addition, the processing machine is not limited to one that processes the processed product W in a vertical posture. It is enough that the processed product W is made in a vertical posture by a posture convert device or the like when carried in the storage apparatus. In addition, the track of the chains 34a and 34b may not be extended along one direction as explained above. The track is allowed to extend in an installation space of the storage apparatus, and can be set freely as long as the held processed products don't contact with each other when they moved. In addition, a member(s) to which the holders are fixed is not limited to the chains 34a and 34b. It is enough that the holders are attached to a string-shaped or band-shaped endless loop member(s). In addition, installation positions of the controller 52, the input unit 53, the detector 54, the memory storage 55 and the display 56 in the processing system KS or KSA are not limited.

In the processing system KSA, the processed products W61 are stored in the storage apparatus 51B at the lower stage and the processed products W62 are stored in the storage apparatus 51T at the upper stage, but the storage locations of the processed products W61 and W62 may be exchanged with each other. Namely, the processed products W61 processed by the laser processing machine 61 are stored in the storage apparatus 51T at the upper stage, and then supplied to the bending machine one by one after being moved circularly on the track (path). The processed products W61 are bent by the bending machine 62, and then may be temporarily stored, as the processed products W62, to the storage apparatus 51B at the lower stage by the carry-out device 67.

Note that shapes of the engagement portion KG and the engagement receive portion HKG that are engaged with each other are not limited to the shapes in the above embodiments. Shapes of the engagement portion and the engagement receive portion can be formed arbitrarily as long as the processed product can be held by the holder. In addition, the processed products (stored products) held by the holders are not limited to sterically-shaped products having a bending portion(s). For example, it is enough that the processed products (stored products) are sterically-shaped products processed so that its total width is made wider than a width of its original material by modifying at least a portion of the material, e.g. by raising. Note that the present invention is suitable for temporal collective-storages of sterically-shaped products, but the processed products (stored products) are not only sterically-shaped products but also may be plate-shaped products.

The invention claimed is:

1. A product storage apparatus for collectively storing processed products having different widths, the apparatus comprising:
   an endless loop that is circularly moved along a path;
   a plurality of holders fixed to the endless loop with a predetermined pitch and configured to hold the processed products; and
   a drive that circularly moves the endless loop to circularly move the plurality of holders while stopping the endless loop temporarily at every move by a distance of a plurality pitches according to a different width of a processed product to be stored.

2. The product storage apparatus according to claim 1, wherein,
   each of the plurality of holders is configured to hold the processed product in a vertical posture and to maintain contact with the processed product at two positions distanced vertically from each other.

3. The product storage apparatus according to claim 1, wherein
   the endless loop is a chain.

4. The product storage apparatus according to claim 1, wherein
   each of the plurality of holders is provided with a slit into which the processed product is inserted.

5. The product storage apparatus according to claim 1, wherein
   each of the plurality of holders is configured to hold the processed product in a suspended state by an engagement with the processed product.

6. A processing system for processing processed products having different widths, the system comprising:
   a first processing machine that processes the processed products;
   a first storage apparatus that collectively stores the processed products processed by the first processing machine temporarily;
   a second processing machine that processes the processed products carried out from the first storage apparatus; and
   a second storage apparatus that is disposed vertically to the first storage apparatus and collectively stores the processed products processed by the second processing machine temporarily, wherein
   the second storage apparatus includes an endless loop that is circularly moved along a path, a plurality of holders fixed to the endless loop with a predetermined pitch and configured to hold the processed products, and a drive that circularly moves the endless loop to circularly move the plurality of holders while stopping the endless loop temporarily at every move by a distance of a plurality pitches according to a different width of a processed product to be stored,
   the first storage apparatus receives the processed products processed by the first processing machine from one side and carries out the processed products to the second processing machine from the one side, and
   the second storage apparatus receives the processed products processed by the second processing machine from the one side and carries out the processed products from another side that is an opposite side to the one side.

7. The processing system according to claim 6, wherein the second storage apparatus includes a panel provided with an opening for carrying out the processed products on the other side.

8. A product storage method for collectively storing processed products having different widths, the method comprising:
- attaching a plurality of holders for holding the processed products to an endless loop that is circularly moved along a path with a predetermined pitch;
- determining, according to a different width of a processed product along a direction of the pitch in a state where the processed products are held by the plurality of holders, a distance of a plurality pitches according to the different width of the processed product to be stored; and
- moving the endless loop to circularly move the plurality of holders while stopping the endless loop at every move by the distance.

9. The product storage method according to claim 8, wherein
the natural number n is determined so that a mathematical product of the pitch and the natural number n becomes a minimum value larger than the width of the processed product.

10. The product storage method according to claim 8, further comprising:
circularly moving the plurality of holders intermittently by stopping the endless loop temporarily at every move by the mathematical product.

11. The product storage method according to claim 8, wherein
each of the processed products is held by any one of the plurality of holders in a vertical posture, and is contacted with the one of the plurality of holders at two positions distanced vertically from each other.

* * * * *